TWISTING AND PLYING SPINDLE BALLOON CONTROL
Original Filed June 16, 1953 4 Sheets-Sheet 1
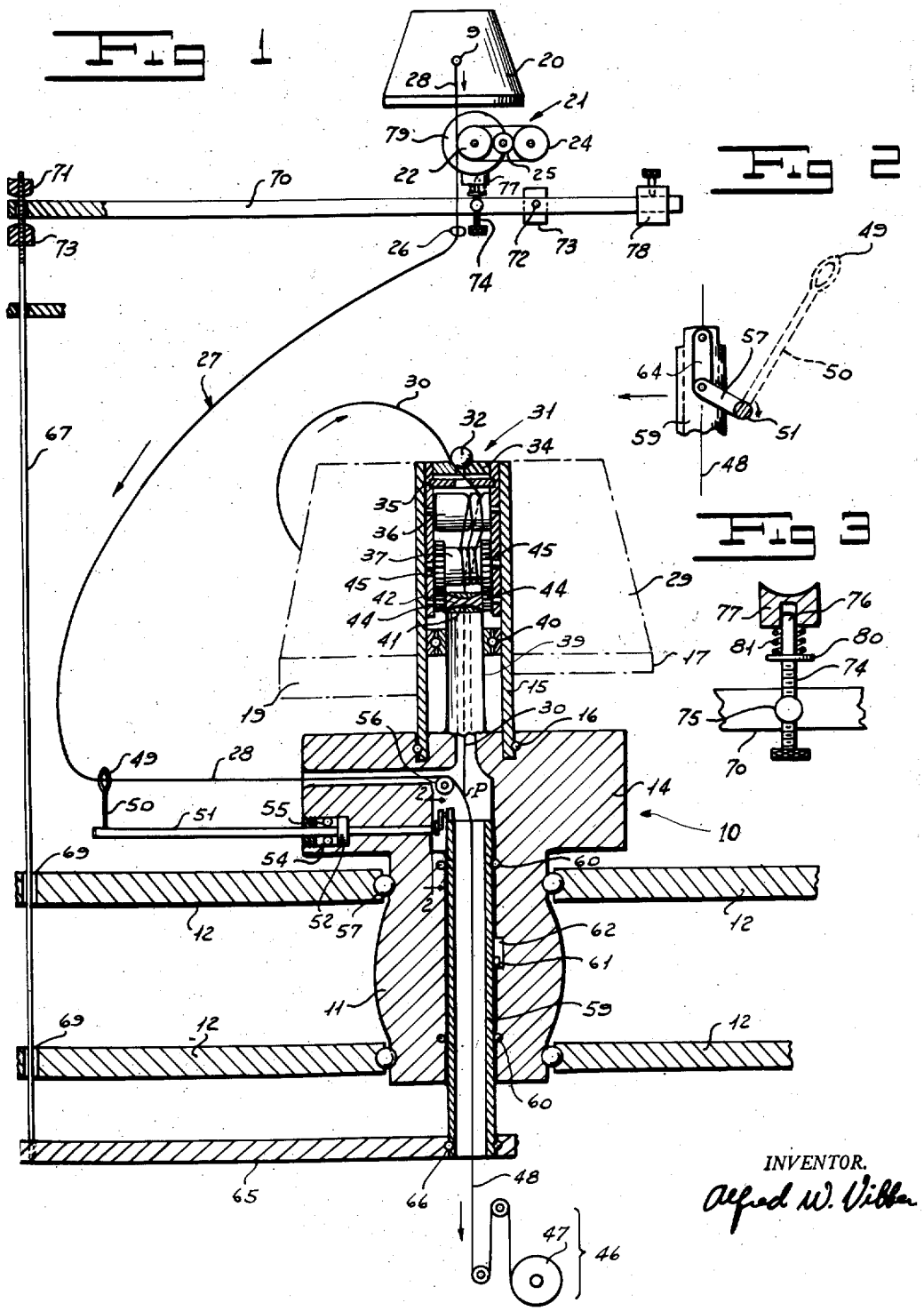
INVENTOR.
Alfred W. Vibber

TWISTING AND PLYING SPINDLE BALLOON CONTROL

Original Filed June 16, 1953 4 Sheets-Sheet 2

INVENTOR.
Alfred W. Vibber

TWISTING AND PLYING SPINDLE BALLOON CONTROL
Original Filed June 16, 1953 4 Sheets-Sheet 3
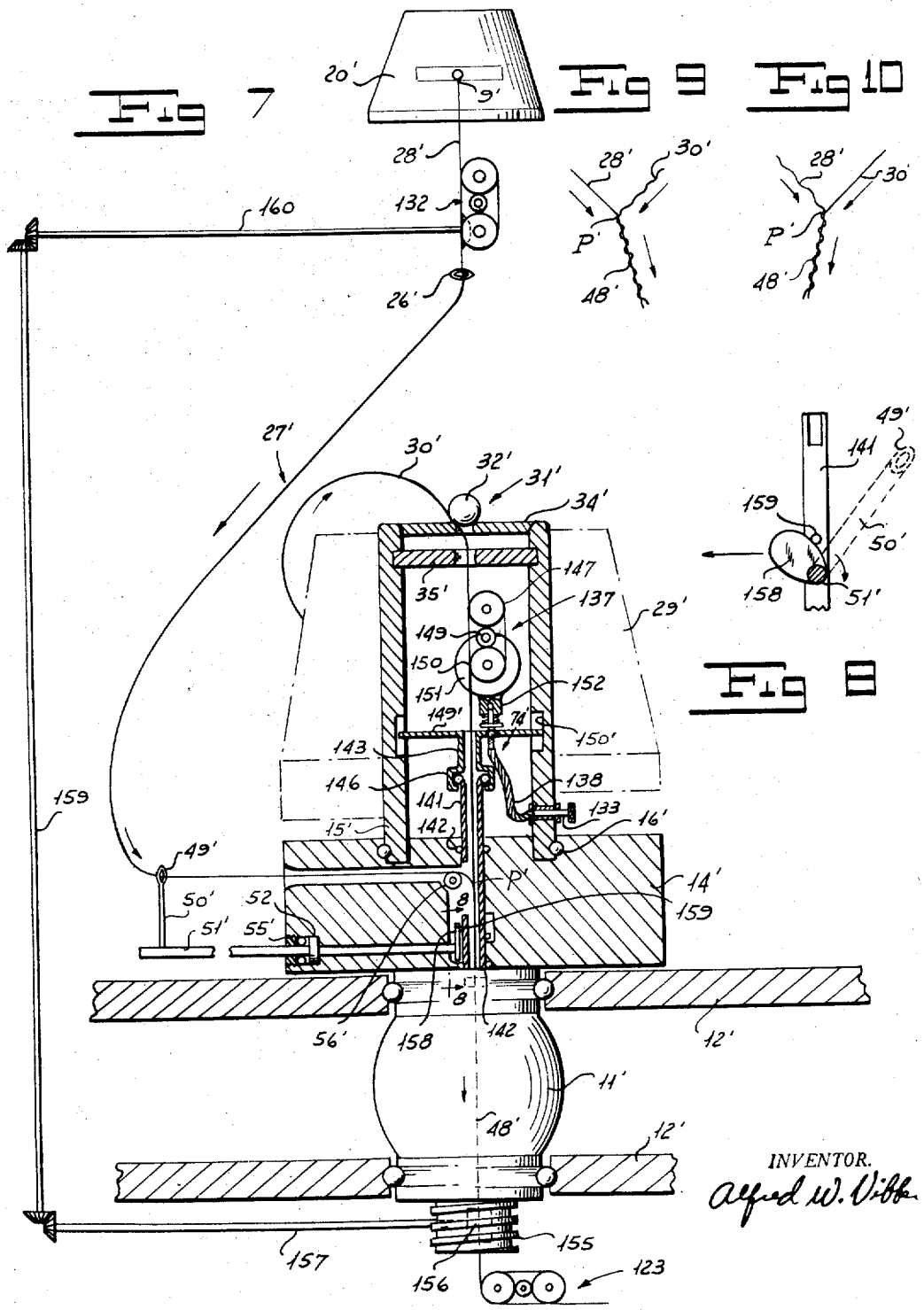
INVENTOR.
Alfred W. Vibber TWISTING AND PLYING SPINDLE BALLOON CONTROL
Original Filed June 16, 1953 4 Sheets-Sheet 4
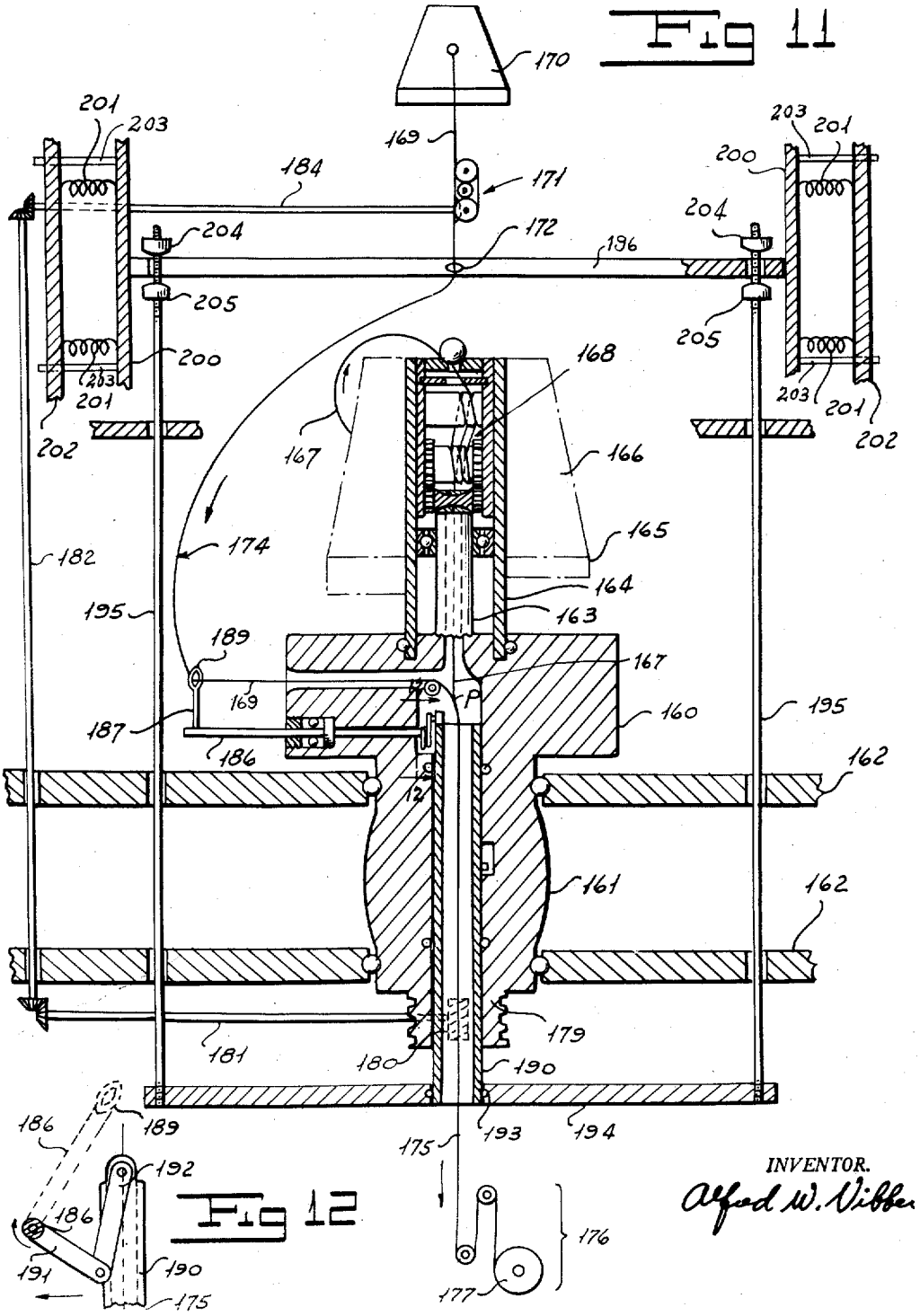

United States Patent Office

Re. 24,380
Reissued Oct. 22, 1957

24,380

TWISTING AND PLYING SPINDLE BALLOON CONTROL

Alfred W. Vibber, Ridgewood, N. J.

Original No. 2,736,160, dated February 28, 1956, Serial No. 361,999, June 16, 1953. Application for reissue December 27, 1956, Serial No. 631,008

35 Claims. (Cl. 57—58.3)

Matter enclosed in heavy brackets [ ] appears in the original patent but forms no part of this reissue specification; matter printed in italics indicates the additions made by reissue.

This invention relates to the control of the balloon or free-flying loop of elongated flexible material present at balloon creating and maintaining twisting and/or plying mechanisms. The invention particularly relates to the control of balloons of spindles of the type wherein the material in the balloon is drawn from the balloon into the rotating shaft or flyer which creates and maintains the balloon. Such type of elongated flexible material treating spindle is herein designated an "infeeding" twisting and/or plying spindle.

This application is a continuation-in-part of application Serial No. 333,242, filed January 26, 1953, application Serial No. 337,191, filed February 16, 1953, now Patent No. 2,726,506 issued December 13, 1955, and application Serial No. 347,943, filed April 10, 1953.

In the drawings accompanying the specification, and forming a part thereof:

Fig. 1 is a somewhat diagrammatic view, partially in section axially of the plying spindle and partially in side elevation, of a first species of one-spindle strand-plying apparatus in accordance with the invention;

Fig. 2 is an enlarged fragmentary view in section, taken along the line 2—2 in Fig. 1, showing the crank connecting the mechanism mounting the balloon-generating eye with the reciprocable shaft of the spindle which controls the balloon shape governing braking means, the eye 49 and the arm 50 being shown in dotted lines in the positions they assume when the balloon is of a diameter within the desired operating range;

Fig. 3 is an enlarged fragmentary view partially in side elevation and partially in section of a portion of the brake shoe actuating mechanism of Fig. 1;

Figure 6:
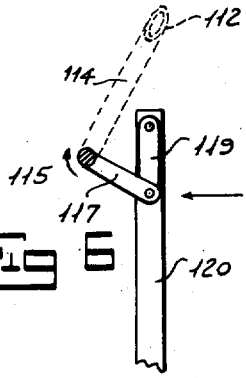
Figure 5:
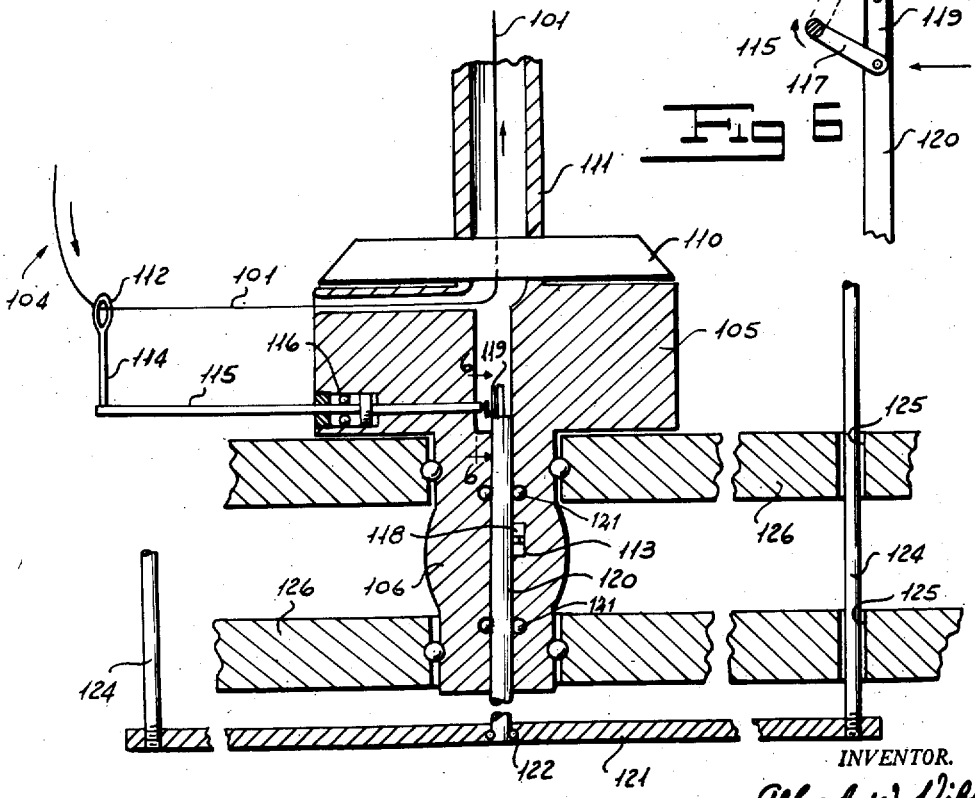
Fig. 5 is an enlarged view, partially in side elevation and partially in axial section, of the flyer mechanism of the central, take-up, spindle of the system of Fig. 4.

Fig. 6 is an enlarged fragmentary view in vertical section taken along the line 6—6 in Fig. 5, showing the connection between the arm for mounting the balloon generating eye and the vertically reciprocable brake-actuating shaft of the central spindle, the eye 112 and the arm 114 being shown in dotted lines in the position they have relative to crank arm 117 when the balloon being controlled is at its desired medial diameter;

Fig. 7 is a somewhat diagrammatic view, partially in side elevation and partially in axial section, of a second embodiment of the one-spindle strand-plying apparatus made in accordance with the invention;

Fig. 8 is an enlarged fragmentary view in section similar to Fig. 2, the section being taken along line 8—8 in Fig. 7;

Fig. 9 is a somewhat diagrammatic view of the strands and cord in a spindle of the type shown in Figs. 1 and 6 but without the balloon controlling mechanism of the invention, the strands and cord being shown in the position which they assume relative to each other when the tension in the strand coming from the balloon is markedly higher than the tension in the strand from the inner package;

Fig. 10 is a view similar to Fig. 9, but with the strands and cord in the position which they assume relative to each other when the tension in the strand coming from the balloon is markedly lower than the tension in the strand from the inner package;

Fig. 11 is a somewhat schematic view, partially in side elevation and partially in section of another embodiment of the one-spindle strand plying mechanism, such mechanism varying the tension in the balloon by varying the distance between the upper balloon guiding eye and the flyer; and Fig. 12 is an enlarged fragmentary view in vertical section taken along the line 12—12 in Fig. 11.

As will be apparent from the above, there are shown and described herein four species of the apparatus, as follows: (1) Figs. 1, 2, and 3, a one-spindle system generally of the type shown in Clarkson Patent No. 2,503,242, in which two strands are twisted together so as to form a two-ply strand, a first strand delivered from a supply thereof being ballooned about a let-off strand package from which the second strand is led; (2) Figs. 4, 5, and 6, a three-spindle system generally of the type shown in Uhlig Reissue Patent No. 23,509, wherein singles strands are delivered from two two-for-one singles supply spindles, are combined, and are then fed into a twisting and plying take-up spindle of the downtwister type; (3) Figs. 7 and 8, a second embodiment of the one-spindle mechanism wherein two strands are twisted together so as to form a two-ply strand, one such strand being ballooned about the let-off package for the other such strand; and (4) Figs. 11 and 12, a third embodiment of the one-spindle strand plying mechanism. The balloons of the strand plying mechanisms of embodiments (1), (3), and (4) and the balloon of the central take-up spindle of embodiment (2) have been hitherto difficult to control in such manner that the apparatus will be free for long periods from operator attention. Such difficulty has arisen because of the inherent and inevitable creep between a feeding means and a strand, no matter how positive the feeding of the strand is attempted to be made, over great lengths of the strand. Thus, over appreciable intervals of time, during which many thousands of feet of cord are produced, it is impossible with prior systems to maintain synchronized feeding of the two strands of embodiments (1), (3), and (4) if the two strand feeding means therefor were positively driven at a fixed speed, and to maintain synchronism of feeding of strands by the feeding means at the entrance end of the balloon and the feeding means at the exit or terminal end of the balloon at the center spindle in embodiment (2) if such strand feeding means in the respective systems were driven at fixed speeds. Control of the balloon of embodiments (1), (3), and (4) is further complicated by the fact that a difference in tension in the two strands immediately above the plying point tends to cause the absorption of different lengths of the two strands into the plied strand. This factor is discussed below in connection with Figs. 9 and 10.

The present invention provides an automatic control for the balloons in all four disclosed embodiments of the invention by providing balloon diameter and/or shape detecting means at the spindle, such means allowing the feeding of a strand or strands into the operative twisting and/or plying zone of the spindle whereby to control the balloon at the spindle. In embodiment (2) the two strand-feeding means at the central spindle engage the same material, the balloon diameter and/or shape detecting means varying the relative speeds of such two feeding means with respect to each other. In embodiments (1), (3), and (4) the two strands to be plied together are initially presented to the spindle along separate and distinct paths, a separate feeding means being employed for each strand to govern its speed of feeding toward the operative plying zone of the spindle. In embodiments (1) and (3) the balloon diameter and/or shape detecting means varies the relative speeds of the means for feeding the two strands to the point or junction of plying them together. In embodiment (1) the means for feeding the first strand into the entrance end of the balloon is variable, the means for feeding the second strand being substantially fixed in speed, wherein in embodiment (3) the means for feeding the first strand into the balloon does so at a substantially constant speed and the means for forwarding the second strand to the operative plying zone of the spindle does so at a variable speed. In embodiment (4) constant speed feeding means are employed to forward the first strand into the balloon and to forward the second strand to the point of plying at substantially the same speed, the tension of the material in the balloon being varied in response to changes in the diameter of the balloon by adjusting the distance between the upper balloon guiding eye and the flyer.

The present invention has among its objects the provision of a novel, simplified, control for the balloon of twisting and/or plying mechanism.

A further object of the invention resides in the provision of a control for balloons of twisting and/or plying mechanism of the infeeding type, such controls being characterized by their simplicity of construction and maintenance, and by the fact that they are essentially mechanical in nature.

Yet another object of the invention lies in the provision of a mechanical control for the balloon of an infeeding type of twisting spindle. In one specific embodiment shown, such spindle is a two-for-one downtwister having a variable speed means for feeding material into the balloon and a substantially constant speed means for withdrawing material from the balloon.

A still further object of the invention in other embodiments thereof lies in the provision of means for controlling the relative speeds of the means for feeding the two strands to be plied toward the point of plying.

An additional object of the invention resides in the provision of the combination of means at the flyer of the spindle for detecting changes in the shape of the balloon with means controlled thereby for changing the tension of the material in the balloon. In one embodiment shown the tension of the material in the balloon is varied by varying the distance of the upper balloon guiding eye from the flyer.

The above and further objects of the invention will be more readily apparent upon consideration of the following description of the preferred embodiments thereof.

In the system shown in Figs. 1 and 2, the first strand, designated 28, proceeds from the first let-off package 20 downwardly through tension control apparatus 21, to be described, into the balloon 27 created by the flyer 14 of the spindle 10. The strand 28 is drawn in through the flyer and meets the second strand 30 fed from the second let-off package 29 at the point P on the axis of the flyer, the two strands being plied together at point P so as to emerge as the plied strand or cord 48. The cord 48 is taken up by a conventional take-up mechanism 46, preferably one such as shown in Clarkson Patent No. 2,503,242, which withdraws the cord and winds it on bobbin 47 under constant tension.

Taking up now the instrumentalities which operate upon the strand 28 in succession, the first let-off package 20 is preferably rotatably mounted on a support diagrammatically shown in Fig. 1 so as to present the cord 28 opposite the feed-off eye 9. Strand 28 proceeds downwardly from the feed-off eye into the strand feeding capstan system generally designated 21. Means 21 is made up of a first multi-grooved capstan 22 and a second multi-grooved capstan 24 spaced therefrom, the two capstans being positively geared together so as to rotate at the same speed and in the same direction by means of a gear on capstan 22, a gear on capstan 24, and the intermediate idle gear 25 meshing with the gears on the capstans, all of such mechanism being carried on fixed framework (not shown). A brake drum 79 is provided on capstan 22 so as variably to retard the two capstans 22 and 24. A brake shoe 77 is thrust against the brake drum 79 by means of the thrust pin 74 mounted on the brake lever 70, such lever being pivotally mounted on a fixed part 73 of the machine by the pivot pin 72. The primary braking effort is contributed by the collar-shaped weight 78 slidable upon the right-hand arm of lever 70 beyond pivot pin 72, and positionable thereon by the set screw on top of the weight. The brake means is additionally variably energized by means of control mechanism, to be described, operated by a balloon shape and/or diameter detecting means mounted on the flyer 14, such detecting means engaging the material of the balloon at the lower, balloon-generating, terminal end of the balloon.

The flyer 14 is in the nature of an enlarged head or flange on the top of the rotatable shaft 11 mounted in bearings in fixed frame parts 12, as shown. The shaft 11 of the flyer, which has its outer surface between frame part 12 crowned to engage a driving belt (not shown), serves as a means of creating and maintaining the balloon 27 in the strand 28, of supporting the second let-off package 29 on top of the flyer in substantially non-rotating position, and of plying the two strands 28 and 30 together at the point P. Let-off package 29 is supported on a flange or platform member 17 positioned on the upper, hollow, shaft 15, the lower end of which is journalled in the flyer 14 through the medium of the bearings 16. Platform 17 is eccentrically weighted at 19 so that, if the spindle 10 is disposed at a small angle to the vertical, the weight 19 will seek the lower position and maintain the package 29 and the shaft 15 substantially non-rotating, even though the flyer 14 rotates at high speed. For ease of illustration the spindles of all embodiments are shown vertical.

The shaft 15 serves also as a support for a means for feeding the strands 30 from package 29 to the plying point P at essentially constant speed. Such feeding means consists of a magnetic ball tension device 31 having a non-magnetic seat 34 positioned across the upper end of the shaft 15, the magnetic ball 32 fitting within such seat, the yarn 30 progressing between the ball and the seat down into the shaft 15. A magnet 35 positioned beneath seat member 34 maintains the ball 32 stably in its seat. After leaving the magnetic ball tension device, the yarn 30 progresses into a radially outer groove on the idle upper multi-grooved feeding roll 36 journalled in shaft 15, and thence proceeds downwardly to the first radially outer groove of the driven multi-grooved pulley 37. The yarn then progresses from groove to groove between pulleys 37 and 36 until it reaches a central groove in driven pulley 37 from which it progresses vertically downwardly to the plying point P.

Pulley 37 is driven in synchronism with the rotation of the flyer 14 by means of the central hollow extension shaft 39 of the flyer, shaft 39 bearing on its upper end the worm 41. Worm 41 meshes with the hourglass worm gear 42 journalled in the tube 15 at a position radially displaced from the center thereof. Hourglass worm gear 42 has on its outer ends the small pinions 44 which mesh with the larger pinions 45 on the pulley 37. It will be apparent that rotation of the flyer 14 and thus of the shaft 39 relative to the shaft 15 will positively rotate the multi-grooved pulley 37. With the proper choice of sizes and hand of the worm 41 and the worm gear 42, and the proper relative sizes of pinions 44 and 45, the yarn 30 will be fed downwardly to the plying point P at the correct speed.

The balloon 27 in strand 28 is created and maintained by the balloon-guiding eye 49 mounted on the arm 50, which, in turn, is mounted on the substantially radially extending shaft or arm 51 projecting from the main flyer body as shown. Arm 51 is stably maintained on the flyer body by means of the flange 52 on the shaft which fits within the recess 54 in the flyer body, and is held therein by a nut member and the interposed thrust bearing 55. As disclosed in connection with the structures of Figs. 5, 9, and 10 of application Serial No. 337,191, the arm 50 bearing balloon-guiding eye 49 will tend to align itself with the incoming end of the balloon, the rotation of arm 51 to allow this affording a measure of the degree of wrap-around of the balloon at the spindle, and thus a measure of the change of shape and/or size of the balloon. In the embodiment of Figs. 1, 2, and 3, such rotation of the arm 51 is employed to add to or subtract from the braking effect of weight 78 imposed on the braking means for the strand-feeding means 21, thereby to maintain the balloon 27 within predetermined limits of diameter. The speed of feeding means 21 controls the speed of feeding of material 28 into the balloon and thus primarily controls the diameter of balloon 27 and also the length of material in the balloon.

As shown more clearly in Fig. 2, the radially inner end of shaft 51 is provided with a crank-forming offset 57, the end of crank arm 57 being connected to a link 64. The other end of the link, in turn, is pivotally connected to one side of the upper end of a hollow reciprocable shaft 59 positioned axially within the main shaft 11 of the spindle. Reciprocation of shaft 59 relative to shaft 11 is facilitated by the mounting of shaft 59 in bearings 60 within shaft 11. Rotation of shaft 59 relative to shaft 11 is prevented by the provision of a radial projection 61 on the former shaft, such projection slidingly fitting within the vertical recess 62 in the inner wall in shaft 11.

It will be apparent from the above that, when the balloon 27 lies substantially in a radial plane containing the axis of spindle 10 the arm 50 will lie substantially parallel with such axis, and that, when such balloon expands, and the degree of wrap-around of the balloon increases, the eye 49 will tilt outwardly in a direction out of the paper in Fig. 1, assuming that the flyer 14 is rotated in such direction that the eye 49 travels into the paper. The direction of travel of the flyer is indicated by the arrow pointing to the left in Fig. 2. Upon such tipping of the eye 49 to align itself and the arm 50 with the incoming end of the balloon, and thus the turning of the shaft 51 in the direction of the curved arrow in Fig. 2, the vertically reciprocable shaft 59 will be raised somewhat, the amount of vertical travel of shaft 59 bearing a fixed relationship with the degree of rotation of shaft 51 about its axis.

Braking means 21 is connected to the bottom end of shaft 59 at a position outside shaft 11 by means of the arm 65, connected to the bottom end of shaft 59 through the medium of the bearing 66, and the vertically reciprocable rod 67 which is guided in openings 69 in frame members 12 of the machine. The upper end of rod 67 is connected to the left-hand end of brake lever 70 through the medium of the adjustable nuts 71 and 73 on the rod above and below, respectively, the lever 70. The nuts are adjusted so that when arm 50 lies in the position shown in Fig. 2, in which it is substantially aligned with the incoming end of the balloon 27 when such balloon is of the desired medial diameter, the nuts are spaced from lever 70 as indicated in Fig. 1. The size and position of weight 78 on lever 70 will be chosen so that the braking effect contributed by weight 78 and lever 70 will ordinarily maintain the balloon 27 stably at such medial diameter.

Should, however, balloon 27 expand unduly, the shaft or arm 51 will turn in the direction of the arrow in Fig. 2. Shaft 59 and rod 67 accordingly will rise, and after a length of travel determined by the adjusted position[ed] of nut 73 such nut will contact the brake lever 70, which acts through spring 81 to apply brake shoe 77 progressively more forcibly to the brake drum 79 of feeding means 21.

Stud 74 is screw-threaded as shown, having threaded engagement with the transverse stud 75 projecting from one side of brake lever 70. Between stud 75 and its upper end 76, stud 74 is provided with a flange 80, between which and the bottom of brake shoe 70 there is disposed the coil-compression spring 81.

Upon the expansion of the balloon and thus the increase of the degree of wrap-around thereof, the brake shoe 77 will be applied to the brake drum 79 by an additive, secondary, force provided by thrust rod 67, thereby to decrease the rate of feeding of the strand 28 into balloon 27. This, in turn, will decrease the size of the balloon 27 and thus decrease the tension in the strand 28 immediately adjacent the plying point P where such strand meets the strand 30 fed thereto at substantially constant speed. The described control of balloon size and/or shape, therefore, also controls the tension of the strand emerging from the balloon and proceeding to the plying point over idle guiding pulley 56 in the flyer, the mechanism maintaining the balloon of such size and shape as to make the tensions in the two strands approaching the plying point and thus the speeds of travel of the two strands substantially equal, the components of the plied strand or cord 48 then each being subjected to one-half the total tension exerted thereon by the constant tension take-up means 46. It has been found that momentary variations in the value of the sum of the components of the tensions in strands 28 and 30 above point P which are opposite the tension in cord 48 produced by take-up mechanism 46 are not sufficient to upset the general over-all balance of tensions in the system. Thus the system, with the described control means, is inherently stable.

Substantially the reverse operations take place upon the marked contraction of the balloon 27 from the medial diameter shown in Fig. 1. Upon such event the arm 50 will tip counterclockwise from the position shown in Fig. 2. If such tipping is of sufficient extent the rod 67 will be pulled downwardly enough for nut 71 to contact lever 70, thus to reduce the braking effort imposed on feeding means 21, and thus to increase the speed of travel of strand 28 therepast.

The adjusted positions of nuts 71 and 73 determine the extent of the range of tipping of arm 50 within which the control mechanism neither adds to nor subtracts from the primary, constant (when adjusted) braking effect of weight 78 and the location of the limits of such range relative to the substantially 90° of oscillation of arm 51 made possible by its mounting. The lost motion connection between the arm 50 and the means applying the secondary (additive or subtractive) braking effect allows the arm freely to detect changes in balloon diameter without at once being affected by the restraining action of the means energized thereby to correct such balloon diameter change.

Figure 4:
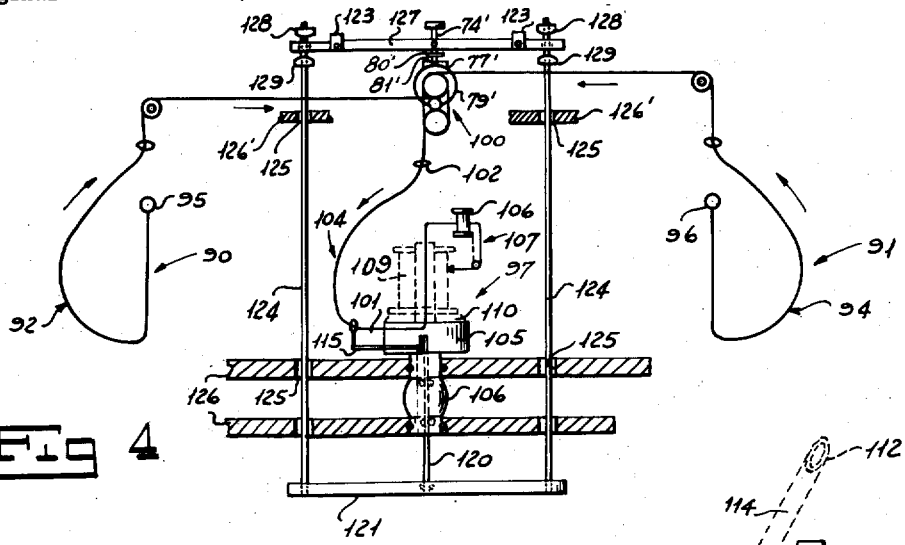
Fig. 4 is a somewhat diagrammatic view, partially in side elevation and partially in axial section, of a three-spindle system for twisting singles strands, for combining them, and for twisting them together.

The means for controlling the balloon 104 of the center spindle 97 of the three-spindle system shown in Figs. 4, 5, and 6 is generally of the same type as that above discussed, such mechanism acting to decrease the speed of the strand-speed-controlling means 100 feeding the material into the balloon upon increase of the balloon diameter and thus of the degree of wrap-around of such balloon.

The system shown consists of two singles twisters 90 and 91 of the two-for-one type, such spindles creating and maintaining balloons 92 and 94, respectively, such spindles having back-tension-imposing means generally designated 95 and 96 thereat. The strands from the spindles 90 and 91 are fed to a strand-speed-controlling and gathering capstan means, generally designated 100, which is of the same type as that shown at 21 in the first disclosed embodiment therein. After being combined, the two strands are led downwardly through the balloon-guiding eye 102 into the balloon 104 created and maintained by the flyer 105 of spindle 97. The combined strands 101 are led from the balloon axially upwardly of the spindle to the positively driven constant speed take-up capstan 106 driven (by means not shown) in synchronism with flyer 105, from which they go to the traversing mechanism generally indicated at 107 to be wound upon the bobbin 109. The bobbin is driven from the flyer through the medium of a slipping clutch generally designated 110, which may be of the type shown and claimed in Agresti Patent No. 2,434,496. The bobbin 109 is mounted upon the hollow shaft 111 driven from the clutch 110, as shown in Fig. 4.

Flyer 105 has the radially projecting arm 115 thereon, such arm being mounted in the flyer by the radial thrust-absorbing bearing 116. Arm 115 has on its outer end the upstanding arm 114 which carries on its upper end the balloon-generating-and-guiding eye 112. Eye 112 and arm 114 are used to detect changes in the size and/or shape of the balloon 104 and to control the severity of application of a brake to the capstan 100. The radially inner end of arm 115 is provided with a crank arm 117, this crank arm being connected to a link 119, the upper end of which, in turn, is pivotally connected to the upper end of the vertically reciprocable shaft 120. Shaft 120 is mounted within the main shaft 106, which supports and drives flyer 105, there being bearings 121 interposed between shaft 120 and such shaft 106. Shaft 120 is keyed to rotate with shaft 106 by the projection 113 on the former which slides in keyway 118 in the latter. Assuming that the flyer 105 is turning in the same direction as that in the first described embodiment, that is, so that the eye 112 goes in the direction into the paper, the arm 114 will allow eye 112 to approach the reader in Fig. 5 upon increase in the diameter and thus the wrap-around of balloon 104. Under such circumstances the shaft 115 will turn in the direction of the small curved arrow in Fig. 5, thereby to thrust the shaft 120 downwardly.

The lower end of shaft 120 is connected to the horizontal arm 121 centrally thereof through the medium of the bearing 122. Each end of the arm 121 has connected thereto a vertical rod 124 which is guided for movement axially of the spindle in the openings 125 in frame parts 126 and 126' of the machine. The upper ends of rods 124 pass freely through holes in the horizontal brake member 127, connection between member 127 and the rods being afforded by the nuts 128 and 129 disposed above and below such member 127 at each rod. As in the case of nuts 71 and 73 in Fig. 1, nuts 128 and 129 are spaced at least slightly from member 127 when arm 114 is tipped when receiving the incoming end of a balloon 104 of medial diameter.

The adjusting stud 74' and the parts associated therewith in this embodiment are the same as those of the correspondingly numbered parts 74, etc. in the first-described embodiment. The primary pressure between the brake shoe 77' and the brake drum 79', when rods 124 do not add to or subtract from such primary pressure, is determined by the total weight of arm 127, the replaceable weights 123 thereon, the brake shoe 77' and the parts connecting shoe 77' to arm 127. The weights 123 will be such that, upon operation of the device, with the balloon 104 at its optimum medial diameter and thus its optimum degree of wrap-around, the feeding means 100, under the control only of the described fixed (when weights 123 are chosen) braking means, will operate to feed strands into the balloon 104 at such rate as to maintain the balloon 104 of the desired optimum size. At such medial diameter the arm 114 occupies the tipped position shown in Fig. 6.

Should, however, the balloon increase unduly in diameter, the arm 114 will rotate about the axis of the arm 115 in the direction of the arrow in Fig. 6. Upon sufficient tipping of arm 114, nuts 128 will contact member 127 and will apply the brake shoe 77' more forcibly to the brake drum 79', thus to decrease the speed of feeding of the combined strands 101 by the means 100. Thereupon the balloon 104 will be restored to its optimum size, upon which event the speed of feeding of the strands at means 100 will be increased because of the consequent reduction of the severity of application of the brake shoe 77' to the brake drum 79' by the balloon diameter detecting means 112, 114, 115 and the linkage between it and the brake operating means. Substantially the reverse operation takes place upon an undue contraction of the balloon, the nuts 129 then acting to lessen the effective braking pressure between brake shoe 77' and drum 79'.

The third embodiment of the twisting and plying spindle of the invention is shown in Figs. 7 and 8. Such embodiment of the apparatus, which is of generally the same type as that shown in Figs. 1, 2, and 3, differs therefrom in that the balloon shape and/or diameter detecting means controls the speed of feeding of the strand from the inner package about which the strand from the outer package is ballooned, the strand from the outer package being fed forward to the point of plying of the strands by a substantially constant speed feeding means. Portions of the apparatus shown in Figs. 7 and 8 which are the same as those shown in Figs. 1, 2 and 3 are designated by the same reference characters with an added prime.

The strand 28' from the outer or upper package 20' is fed downwardly through the substantially constant speed feeding means 132 through the eye 26' into the balloon 27' created and maintained by the flyer 14'. The strand 30' from inner package 29' is fed through the magnetic ball tension means 31' to the variable speed strand-feeding means generally designated 137. Means 137, which is of the multi-grooved strand-feeding type, is generally of the same construction as that shown at 21 in Fig. 1. Means 137 consists of an upper multi-grooved pulley 147, a lower multi-grooved pulley 150 cooperating therewith, and an idle gear 149 connecting the two pulleys to rotate at the same peripheral speed, all journalled in the opposite sidewalls of tube 15'. Pulley 150 is provided with the brake drum 151 which is variably retarded by the brake shoe 152, the brake shoe, in turn, being actuated by mechanism to be described, whereby the speed of travel of strand 30' toward plying point P' is controlled by means responsive to changes in the diameter and/or shape of the balloon 27'.

The speed of travel of strand 28' into balloon 27' is maintained substantially constant by the feeding means 132, which is driven in synchronism with the flyer 14' by means of the worm 155 on the bottom of the main spindle shaft 11', the worm gear 156 meshing therewith, and the interconnecting shaft system consisting of the bottom horizontal shaft 157, the vertical shaft 159, and the top horizontal shaft 160 connected to means 132 by gears as indicated, the shafts being connected to rotate at the same speed by the mitre gear shown. The speed of feeding of strand 28' by means 132 is constant except for the described gradual creep of the strand one way or another with respect to the feeding means.

The speed of withdrawal of the strand 28' from the balloon 27' depends on the rate at which it is taken up or absorbed into the plied strand by being twisted about strand 30' at plying point P'. If, as indicated diagrammatically in Fig. 9, the tension in strand 28' immediately above the point P' exceeds that in the strand 30' immediately above point P', the strand 28' will tend to straighten out and function somewhat as a core about which strand 30' is wrapped, so that a greater length of strand 30' is absorbed into plied strand or cord 48' than the length of strand 28' so absorbed. If, however, the tension in strand 30' immediately about point P' exceeds that of strand 28' immediately above such point, as shown in Fig. 10 the strand 30', in turn, will tend to straighten out and function as a core, so that a greater length of strand 28' is absorbed into the plied strand of cord 48' than the length of strand 30' so absorbed.

It will be evident that the condition of the inequality of tensions in the two strands depicted in Fig. 9 can be rectified by a decrease in the tension in strand 28' relative to that in strand 30' and that the condition of inequality of tensions shown in Fig. 10 can be corrected by an increase in the tension in strand 28' relative to that in strand 30'. At a condition wherein the tensions in the two strands are equal, the same or substantially the same lengths of the two strands will be absorbed into the twisted cord or plied strand 48', and substantially the same lengths of the two strands will be pulled forward to the plying point P'. It has been found that the variations in tension in the two strands, to overcome the conditions depicted in Figs. 9 and 10, can be effected by the mechanism of Figs. 7 and 8 without unduly upsetting the general over-all balance of tensions in the system, since the inequalities in the tensions in strands 28' and 30', in effecting control of the balloon in the manner to be described, need not be large. The cam 158, shown in Fig. 8, whereby the tension in strand 30' is varied is there exaggerated as to the length of its throw for clarity of illustration.

The take-up means 123 is of the substantially constant speed type. Even though the momentary sum of the components of the tensions in strands 28' and 30' above point P' which are opposite the tension in cord 48' may be slightly greater or less than the momentary tension in cord 48', such differences are so small and of such short duration as not to require any added compensation or operator attention.

We have seen that the degree of tipping of the eye 49' and of the arm 50' about the axis of the arm 51' is a measure of the diameter of the balloon 27'. When the balloon 27' increases in diameter, the tension in strand 28' immediately above point P' increases. Thus, we can use the degree of rotation of arm 51' about its axis as a means of adjusting the tension in strand 30', the variation in tension in strand 30', in turn, causing a variation, in the required direction to restore the balloon to its medial diameter, in the rate of withdrawal of the strand 28' from the balloon 27'.

The flyer 14' is provided with a vertically reciprocable hollow shaft 141 positioned axially therein, the bearings 142 in which the shaft 141 is mounted facilitating reciprocation thereof. Connection between the inner end of the arm 51' and shaft 141 is effected by a cam 158 at the radially inner end of arm 51' and a cam follower 159 connected to shaft 141 and riding upon the cam. As evident from Fig. 8, shaft 141 will rise when the arm 51', and thus the arm 50' and the eye 49', turn in the direction of the small curved arrow on that figure. Rotation of arm 51' so as to cause eye 49' to travel out of the paper in Fig. 7, assuming that the flyer 14' is travelling in the direction of the straight arrow in Fig. 8, accordingly will cause hollow shaft 141 to rise. The arm 50' is shown in Fig. 8 tipped in the position it assumes when balloon 27' is of medial diameter.

Above the flyer 14', the shaft 141 is provided with a bearing means 146 which allows rotation of the upper portion 143 of such shaft relative to the main portion 141. To the upper portion 143 there is connected the cross member 149', the ends of which reciprocate vertically in the recesses or slots 150' in the inner wall of the tube 15'. Member 148' carries the brake-shoe-adjusting stud 74' having a threaded engagement therewith, such stud having the same structure as stud 74 in the first described embodiment. On the upper end of stud 74', there is mounted the spring-pressed brake shoe 152 which bears against the brake drum 151. It will be apparent that, as shaft 141 and thus member 149' rise, brake shoe 152 will be pressed more strongly against brake drum 151, thereby to decrease the speed of travel of strand 30' past feeding means 137. When descent of the shaft 141 causes brake drum 151 to be engaged less strongly by the brake shoe, the speed of rotation of means 137 is increased, thereby to increase the rate of feeding of strand 30' therepast. Adjustment of stud 74' and thus of brake shoe 152 against the brake drum is accomplished by the knob 133, journalled in the wall of tube 15', the knob being connected to stud 74' by the flexible shaft 138.

When the balloon 27' of the mechanism of Fig. 7 increases in diameter, the tension in strand 28' increases and the rate of withdrawal of strand 28' from the balloon decreases, as explained in connection with Figs. 9 and 10. Upon such increase in diameter of balloon 27' beyond its desired medial diameter, the described control mechanism functions to increase the tension in strand 30', thereby to increase the rate of withdrawal of strand 28' from the balloon and to decrease the diameter of the balloon 27'. Should, however, the balloon 27' decrease unduly in diameter from its desired medial diameter, the tension in strand 28' and the rate of withdrawal of strand 28' from its balloon will have increased. The control mechanism of Fig. 7 will then function to decrease the tension in strand 30', thereby to decrease the rate of withdrawal of strand 28' from the balloon 27' and to increase the diameter of balloon 27'. Accordingly, upon the proper choice of component sizes and the proper initial adjustment of the parts the control mechanism will tend to cause balloon 27' to seek the desired predetermined medial diameter and to remain there. The mechanism of Fig. 7, therefore, is stable in operation, and will hold the diameter of balloon 27' within a narrow range, which has the desired medial diameter of the balloon as a substantially midpoint thereof.

In Figs. 11 and 12, there is shown embodiment (4) of the apparatus, such embodiment being a one-spindle device for plying two strands together. In such device, the two-strand feeding means, that designated 171 for feeding strand 169 from the upper outer package 170 and that generally designated 168 for feeding the strand 167 from the inner package, are both positively driven at the same speed so as to forward the same length of each strand to the point of plying P, except for the inevitable inequality of such rates of feed caused by creep of the strands at the feeding means. The device of the invention is designed to control the tension of the material 169 in balloon 174. If such balloon deviates unduly from the desired medial diameter, the change in tension in the balloon 174 produced by the controlling means will change the attitude of the two strands with respect to each other as they approach the plying point P. Such change of tension alters the rate of absorption of the strand 169 into the plied cord in such direction as to return the balloon 174 to its desired medial diameter.

The strand plying device of Figs. 11 and 12 comprises a flyer 160 in the form of an enlarged head on the main shaft 161 journalled, as shown, in frame parts 162. Flyer 160 has rising centrally thereof the tube-like extension 163, and has journalled on the top thereof, so as to remain non-rotating thereon, the outer tubular member 164. Positioned on member 164 is the eccentrically weighted platform 165, upon which is supported the inner package 166. Within the upper portion of the support 164 there is positioned the positively driven strand feeding means 168, which is driven in synchronism with the flyer from the top of the flyer extension 163. The structure of feeding means 168 and its manner of drive are essentially the same as the feeding means for the strand 30 in the embodiment shown in Fig. 1.

The flyer 160 is provided with a radial arm 186 mounted thereon for oscillation about the axis of the arm. Arm 186 bears on its outer end the upright arm 187, on the upper end of which is affixed the eye 189 for guiding the material 169 inwardly from the balloon 174 thereof and for creating and maintaining said balloon. Strand 169 proceeds inwardly from eye 189 into the flyer, where it meets strand 167 at the plying point or junction P. The resulting plied strand 175 travels downwardly through the shaft 161 to be coiled on the take-up bobbin 177 of the constant tension take-up means 176.

Rotation of the arm 186 about its axis is employed as a means for adjusting the distance of the balloon or free-flying loop-guiding eye 172 from the flyer 160, whereby to vary the tension in the material in the balloon 174. The inner end of arm 186 is provided with an offset forming a crank arm 191, as more clearly shown in Fig. 12. The outer end of crank arm 191 is connected to the link 192, the top of which is connected to the top of the vertically recopricable tube 190, positioned coaxial of the shaft 161. Shaft 190, which is similar to the tube 59 in Fig. 1, is keyed to the shaft 161 so as to be rotatable therewith. Ball bearings between shaft 190 and shaft 161 facilitate the reciprocation of the former in the latter.

The flyer 161 is assumed to be travelling in the same direction as that in Fig. 1, that is, in the direction of the straight arrow, to the left, in Fig. 12. As the balloon 174 increases in diameter, its degree of wrap-around also increases, so that the eye 189 and the arm 187 will be tipped clockwise, in the direction of the small curved arrow in Fig. 12, thereby to thrust tubular shaft 190 downwardly. The lower end of shaft 190 is connected to the horizontal arm 194 through the medium of the ball bearing 193. Connected to the outer ends of arm 194 are the vertical rods 195 which extend guiding openings in the frame members 162. The upper ends of rods 195 extend through the horizontal arm 196, which supports the balloon-guiding eye 172 on a projection on the forward face thereof as it is shown in Fig. 11.

Arm 196 is frictionally stably supported between vertical plates 200 which are held parallel by rods 203 thereon slidable in frame parts 202, and which are pressed toward each other by coil compression springs 201 acting between each of plates 200 and its frame part 202. The engagement between arm 196 and plates 200 is such that arm 196 will remain, under operating conditions, in the position in which it is placed but may be adjusted by rods 195 when they are thrust upwardly or pulled downwardly by eye 189, arm 187, arm 186, etc.

Nuts 204 and 205 are position on rods 195 above and below, respectively, arm 196. The preferred spacing of such nuts on the rods is such that when eye 172 lies at the correct distance from flyer 160 and when the arm 186 is tipped as shown in Fig. 12 by a balloon 174 of medial diameter, the nuts are spaced a small distance from the arm 196 at both the top and bottom thereof.

Feeding means 168 and 171 are driven at the same speed. Such drive is effected by means of the worm 179 on the bottom of main shaft 161, the worm gear 180 meshing therewith, and the shafts 181, 182, and 184, extending serially from the worm gear 180 to the feeding means 171, such shafts being connected by mitre gears, as shown.

Upon the correct initial adjustment of the distance of arm 196 and eye 172 from the flyer, and upon the attainment of the correct diameter of balloon 174 under running conditions, such device will run for an appreciable time without deviation of such balloon from such medial diameter. Under such conditions the arm 186 will be tipped as shown in Fig. 12. Should the described inherent creep between the strands and their respective feeding means be such that eventually the balloon 174 becomes too large, the arm 187 will tip clockwise, thereby depressing the shaft 190 and lowering the eye 172. The inherent tension of the material in such shorter balloon is less than that of material in the longer balloon. Thus, the strands 169 and 167, which, when the balloon had expanded, had a relationship to each other such as that of strands 28′ and 30′, respectively, shown in Fig. 9, will have such orientation changed until they approach a condition such as that shown in Fig. 10. As a result, the strand 169 which, under expanded balloon condition was absorbed too slowly into the plied strand, will now be absorbed into such strand at a faster rate, whereby the diameter of the balloon 174 will decrease. When the diameter of the balloon 174 has returned to its medial value, the arm 187 and the eye 189 will tilt counterclockwise, thereby to resume their desired operating positions and to raise the eye 172 to its corresponding operating position. It is obvious that the balloon diameter control of this embodiment will also function to return the balloon 174 to its medial diameter should such balloon contract unduly.

Whereas for purposes of illustration I have shown and described preferred embodiments of the mechanism of the invention for controlling the balloon or free-flying loop of elongated flexible material at spindles of the "infeeding" twisting and/or plying type, it is to be understood that such embodiments are illustrative only and that the scope of the invention is to be defined by the claims appended hereto.

I claim as new the following:

1. A strand-forming machine comprising a plurality of singles twisters, means for doubling the strands issuing from the singles twisters to a plied strand, said doubling means effecting a twisting operation in a free-flying balloon, a flyer creating and maintaining said balloon, a first means for feeding the combined strands into the balloon, means for selectively varying the speed of said first feeding means to vary the speed of the combined strands therepast, a second means for feeding the plied strands from the balloon, means on the flyer engaging the plied strands as they pass therealong for detecting changes in the shape of the balloon, and means responsive to the last-named means to actuate the speed-varying means of the first feeding means thereby to maintain the diameter of the balloon within predetermined limits.

2. A strand-forming machine comprising a plurality of singles twisters, means for doubling the strands issuing from the singles twisters into a plied strand, said doubling means effecting a twisting operation in a free-flying balloon, said doubling means having a flyer creating and maintaining said balloon, a first variable speed means for feeding the combined strands into the balloon, a variable braking means operative upon the first feeding means for varying the speed thereof, a second means for feeding the plied strand from the balloon, a balloon-generating strand-engaging guide mounted on the flyer, an arm mounting the guide, means mounting the arm for displacement on the flyer with respect to the flyer in response to changes in the shape of the balloon, and means responsive to displacement of the guide-mounting arm relative to the flyer to operate the variable braking means whereby to maintain the diameter of the balloon within predetermined limits.

3. A strand-forming machine comprising a plurality of singles twisters, a spindle for doubling the strand issuing from the singles twisters to a plied strand, said doubling spindle effecting a twisting operation in a free-flying balloon, a flyer creating and maintaining said balloon, a first means for feeding the combined strands into the balloon, means for selectively varying the speed of said first feeding means to vary the speed of the combined strands therepast, a second, substantially constant speed, means for feeding the plied strands from the balloon, balloon-generating material-engaging guide means on the flyer movable with respect to the flyer upon changes in the shape of the balloon, a reciprocable shaft mounted axially of the spindle, means connecting the guide means to the shaft to reciprocate the latter by the movement of the balloon-generating guide means with respect to the flyer, said reciprocable shaft extending outside the spindle, and means operatively connecting the reciprocable shaft at a location outside the spindle to the means for selectively varying the speed of the first feeding means thereby to maintain the diameter of the balloon within predetermined limits.

4. A strand-forming machine comprising a plurality of singles twisters, a spindle for doubling the strands issuing from the singles twisters into a plied strand, said doubling spindle effecting a twisting operation in a free-flying balloon, said doubling spindle having a flyer creating and maintaining said balloon, a first variable speed means for feeding the combined strands into the balloon, a variable breaking means operative upon the first feeding means for varying the speed thereof, a second, substantially constant speed, means for feeding the plied strand from the balloon, a balloon-generating strand-engaging guide mounted on the flyer adjacent the periphery thereof, an arm to which the guide is connected, means mounting the arm for oscillation on the flyer in a plane parallel to the axis of the flyer and generally normal to the radius of the flyer, a reciprocable shaft mounted axially of the spindle and connected to the guide-arm-mounting means so as to be reciprocated thereby, the reciprocable shaft extending outside the spindle, and linkage means connecting the reciprocable shaft at a location outside the spindle to the variable braking means whereby to operate said variable braking means to maintain the diameter of the balloon within predetermined limits.

5. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, means on the shaft for detecting changes in the shape of the loop, said last-named means comprising a loop-generating strand-engaging guide mounted on the shaft adjacent the periphery thereof, an arm to which the guide is connected, means mounting the arm for oscillation on the shaft in a plane parallel to the axis of the shaft and generally normal to a radius of the shaft, a second means for feeding the second strand to the junction where they are plied together, means taking up the plied strand, and means responsive to the loop-shape-detecting means to vary the speeds of the first and second feeding means relative to each other whereby to maintain the diameter of the loop within predetermined limits.

6. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first, variable speed, means for feeding the first strand into the loop, loop-engaging means on the shaft for detecting changes in the shape of the loop, a second, substantially constant speed, means for feeding the second strand to the junction where they are plied together, and means responsive to the loop-shape-detecting means to vary the speed of the first feeding means whereby to maintain the diameter of the loop within predetermined limits.

7. Mechanism for twisting together two strands so as to form a two-ply strand, comprising a support carrying a first let-off strand package for a first strand and a support carrying a second let-off strand package for a second strand, a rotatable hollow shaft operable to rotate a loop of the strand of the first package about the second package and also to ply the two strands together, a first, variable speed, means for feeding the first strand into the loop, a loop-generating strand-engaging guide mounted on the shaft, means mounting the guide for displacement by the loop with respect to the shaft upon changes in the shape of the loop, a second, substantially constant speed, means for feeding the second strand to the junction within the shaft where they are plied together, and means responsive to displacement of the guide relative to the shaft to vary the speed of the first feeding means thereby to maintain the diameter of the loop within predetermined limits.

8. Mechanism for twisting together two strands so as to form a two-ply strand, comprising a source of supply of a first strand and a support carrying a let-off strand package for a second strand, a rotatable first, main, hollow shaft operable to rotate a loop of the first strand about the let-off package and also to ply the two strands together, a first, variable speed, means for feeding the first strand into the loop, means for variable braking said first feeding means, means on the first shaft for detecting changes in the shape of the loop, said last-named means comprising a loop-generating strand-engaging guide mounted on the first shaft, means mounting the guide for displacement by the loop with respect to the first shaft, a second, substantially, constant, speed means for feeding the second strand to the junction where they are plied together, a second hollow shaft positioned coaxially of the first shaft for reciprocation therein, means connecting the reciprocable shaft to the guide-mounting means on the first shaft whereby the second shaft is reciprocated by displacement of the guide-mounting means, and means connecting the second shaft to the variable speed-braking means whereby to vary the speed of the first feeding means to maintain the diameter of the loop within predetermined limits.

9. Mechanism for twisting together two strands so as to form a two-ply strand, comprising a source of supply of a first strand and a support carrying a let-off strand package for a second strand, a rotatable, first, main, hollow shaft operable to rotate a loop of the first strand about the let-off package and also to ply the two strands together, a first, variable speed, means for feeding the first strand into the loop, means for variable braking said first feeding means, means on the first shaft for detecting changes in the shape of the loop, said last-named means comprising a loop-generating strand-engaging guide mounted on the shaft adjacent the periphery thereof, an arm to which the guide is connected, means mounting the arm for oscillation on the shaft in a plane parallel to the axis of the shaft and generally normal to a radius of the shaft, a second, substantially constant, speed means for feeding the second strand to the junction where they are plied together, means taking up the plied strand, a second shaft positioned coaxially of the first shaft for reciprocation therein, means connecting the reciprocable shaft to the guide-mounting arm on the first shaft whereby the second shaft is reciprocated by oscillation on the guide-mounting arm, and means connecting the second shaft at a location outwardly beyond the first shaft to the variable speed-braking means whereby to vary the speed of the first feeding means to maintain the diameter of the loop within predetermined limits.

10. A multiple-twist twisting spindle of the downtwister type, said spindle comprising a rotatable hollow shaft for creating and maintaining a free-flying balloon, a first means for feeding elongated flexible material into the balloon, means for selectively varying the speed of said first feeding means for varying the speed of the elongated flexible material into the balloon, a second, substantially constant speed, means for feeding the twisted material from the balloon and into the shaft, means on the rotatable shaft engaging the flexible material as it passes radially therealong for detecting changes in the shape of the balloon, and means responsive to the last-named means to actuate the speed-varying means of the first feeding means thereby to maintain the diameter of the balloon within predetermined limits.

11. A two-for-one twisting spindle of the downtwister type, said spindle comprising a hollow rotatable shaft for creating and maintaining a free-flying balloon, a first, variable speed, means for feeding elongated flexible material into the balloon, a variable braking means operative upon the first feeding means for varying the speed thereof, a second means for feeding the twisted elongated flexible material from the balloon and into the shaft at substantially constant speed, a balloon-generating material-engaging guide mounted on the shaft, an arm to which the guide is connected, means mounting the arm for oscillation on the shaft in a plane parallel to the axis of the shaft and generally normal to the radius of the shaft whereby it may align itself with the terminal end of the balloon, and means responsive to angular displacement of the guide-mounting arm relative to the shaft to operate the variable braking means whereby to maintain the diameter of the balloon within predetermined limits.

12. A two-for-one twister of the downtwister type, said twister comprising a rotatable hollow main, first, shaft for creating and maintaining a free-flying balloon, a first means for feeding the elongated flexible material into the balloon, means for selectively varying the speed of the first feeding means for varying the speed of material therepast, a second, substantially constant speed, means for feeding the twisted material from the balloon and into the main shaft, balloon-generating material-guiding means on the main shaft engaging the material as it passes radially of the main shaft, said guiding means being movable relative to the main shaft upon changes in the shape of the balloon, a second shaft positioned coaxially within the first shaft and reciprocable by the material-guiding means, said reciprocable shaft extending outwardly beyond the first shaft, and linkage means connecting the reciprocable shaft at a location outwardly of the first shaft to the means for selectively varying the speed of the first feeding means thereby to maintain the diameter of the balloon within predetermined limits.

13. Mechanism for twisting together two strands so as to form a two-ply strand, comprising a source of a first strand and a support carrying a let-off strand package for a second strand, a rotatable shaft operable to rotate a loop of the first strand about the second package and also to ply the two strands together, a first, substantially constant speed, means for feeding the first strand into the loop, a loop-generating stand-engaging guide mounted on the shaft, means mounting the guide for displacement relative to the shaft by the loop upon changes in the shape of the loop, a second, variable speed, means for feeding the second strand from the let-off package to the junction where the strands are plied together, means for controlling the second feeding means, and means operatively connecting the guide to the means for controlling the second feeding means to vary the speed of forwarding of the second strand to the point of plying of the strands together and thus to vary the rate of withdrawal of the first strand from its balloon to maintain the diameter of the balloon within predetermined limits.

14. Mechanism for twisting together two strands so as to form a two-ply strand, comprising a source of a first strand and a support carrying a let-off strand package for a second strand, a rotatable shaft operable to rotate a loop of the first strand about the second package and also to ply the two strands together, a first, substantially constant speed, means for feeding the first strand into the loop, a loop-generating strand-engaging guide mounted on the shaft, means mounting the guide for displacement relative to the shaft by the loop upon changes in the shape of the loop, a second, variable speed, means for feeding the second strand from the let-off package to the junction where the strands are plied together, means for controlling the second feeding means, a second shaft positioned coaxial of the first shaft and reciprocable with respect thereto, means connecting the guide-mounting arm to the reciprocable shaft so as to reciprocate the latter upon displacement of the guide relative to the first shaft, and means connecting the reciprocable shaft to the means for controlling the second feeding means to vary the speed of forwarding of the second strand to the point of plying of the strands together and thus to vary the rate of withdrawal of the first strand from its balloon to maintain the diameter of the balloon within predetermined limits.

15. Mechanism for twisting together two strands so as to form a two-ply strand, comprising a source of a first strand and a support carrying a let-off strand package for a second strand, a rotatable shaft operable to rotate a loop of the first strand about the second package and also to ply the two strands together, a first, substantially constant speed, means for feeding the first strand into the loop, a loop-generating strand-engaging guide mounted on the shaft, an arm to which the guide is connected, means mounting the arm for oscillation on the shaft in a plane parallel to the axis of the shaft and generally normal to a radius of the shaft, a second, variable speed, means for feeding the second strand from the let-off package to the junction where the strands are plied together, means for controlling the second feeding means, and means operatively connecting the guide to the means for controlling the second feeding means to vary the speed of forwarding of the second strand to the point of plying of the strands together and thus to vary the rate of withdrawal of the first strand from its balloon to maintain the diameter of the balloon within predetermined limits.

16. Mechanism for twisting together two strands so as to form a two-ply strand, comprising a support carrying a first let-off strand package and a support carrying a second let-off strand package, a first rotatable shaft operable to rotate a loop of the strand from the first package about the second package and also to ply the two strands together, a first, substantially constant speed, means for feeding the first strand into the loop, a loop-generating strand-engaging guide mounted on the first shaft adjacent the periphery thereof, an arm to which the guide [in] *is* connected, means mounting the arm for oscillation on the first shaft in a plane parallel to the axis of the shaft and generally normal to a radius of the first shaft whereby it may align itself with the terminal end of the loop, a second, variable speed, means for feeding the second strand from the second let-off package to the junction where the strands are plied together, variable braking means for the second feeding means, means taking up the plied strand, a second shaft positioned coaxial of and within the first shaft and reciprocable with respect thereto, means connecting the guide-mounting arm to the second shaft so as to reciprocate the latter upon oscillation of the arm, and means connecting the second shaft to the variable braking means whereby to vary the speed of forwarding of the second strand to the point of plying of the strands together and thus to vary the rate of withdrawal of the first strand from its balloon to maintain the diameter of the balloon within predetermined limits.

17. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first substantially positive means for feeding the first strand into the loop at a substantially constant speed, means on the shaft for detecting changes in the shape of the loop, said last-named means comprising a loop-generating strand-engaging guide mounted on the shaft adjacent the periphery thereof, an arm to which the guide is connected, means mounting the arm for oscillation on the shaft in a plane parallel to the axis of the shaft and generally normal to a radius of the shaft, a second substantially positive means for feeding the second strand at a substantially constant speed to the junction where they are plied together, means taking up the plied strand, a vertically adjustable loop-guiding eye spaced from the shaft and located coaxially thereof, and means responsive to the loop-shape-detecting means to vary the height of the eye whereby to maintain the tension in the loop within predetermined limits.

18. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first substantially positive means for feeding the first strand into the loop at a substantially constant speed, means on the shaft for detecting changes in the shape of the loop, said last-named means comprising a loop-generating strand-engaging guide mounted on the shaft adjacent the periphery thereof, an arm to which the guide is connected, means mounting the arm for oscillation on the shaft in a plane parallel to the axis of the shaft and generally normal to a radius of the shaft, a second substantially positive means for feeding the second strand at a substantially constant speed to the junction where they are plied together, means taking up the plied strand, a vertically adjustable loop-guiding eye spaced from the shaft and located coaxially thereof, and linkage means connecting the radially inner end of the arm to the means for adjusting the eye, said last-named means being so constructed and arranged that when the degree of wrap-around of the loop increases the eye is lowered and that when the degree of wrap-around of the loop decreases the eye is raised whereby the tension in the loop is maintained within predetermined limits.

19. A spindle of the infeeding type for handling elongated flexible material, said spindle comprising a rotatable shaft for creating and maintaining a free-flying rotating loop of elongated flexible material, a loop-guiding eye spaced from the end of the shaft, constant speed means for feeding the material into the loop, means responsive to the tension in the loop for withdrawing the material from the loop at a variable speed, loop-generating guide means on the shaft for engaging the terminal end of the free-flying loop, means mounting the guide means for movement with respect to the shaft by the free-flying loop passing therethrough, and means operative in response to movement of the guide means relative to the shaft selectively to adjust the loop guiding eye toward and away from the shaft.

20. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, a second, variable speed, means for feeding the second strand to the junction where they are plied together, means on the shaft for guiding the first strand so that it passes freely in its travel from the loop to the plying junction, and means responsive to changes in the size of the loop to vary the speed of the second feeding means, whereby to vary the relative rates of absorption of the first and second strands into the plied strand so as to maintain the tension in the loop within predetermined limits.

21. Mechanism for twisting together two strands so as to form a two-ply strand, comprising a source of supply for a first strand and a support carrying a let-off strand package for a second strand, a rotatable shaft operable to rotate a loop of the first strand about the let-off package and also to ply the two strands together, a first substantially positive means for feeding the first strand into the loop at a substantially constant speed, a second, variable speed means for feeding the second strand to the junction where the strands are plied together, means on the shaft for guiding the first strand so that it passes freely in its travel from the loop to the plying junction, and means responsive to changes in the size of the loop to vary the speed of the second feeding means, whereby to vary the relative rates of absorption of the first and second strands into the plied strand.

*22. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first means for feeding the first strand into the balloon, means for detecting changes in the shape of the balloon, a second means for feeding the second strand to the junction where they are plied together, and means responsive to the balloon-shape-detecting means to vary the tension in the second strand as it approaches the plying junction.*

*23. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, balloon-engaging means for detecting changes in the shape of the loop, a second means for feeding the second strand to the junction where they are plied together, and means responsive to the loop shape-detecting means to vary the tension in the second strand as it approaches the plying junction.*

*24. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, a second means for feeding the second strand to the point where they are plied together, one of said feeding means being driven at a constant speed and the other of said feeding means feeding its strand therepast at a variable speed, the two feeding means controlling the speeds at which their respective strands travel to the plying point, means to vary the strand feeding speed of the said variable feeding means to vary the relative rates of absorption of the first and second strands into the plied strand, and means which is responsive to changes in the size of the loop and which operates the means to vary the strand feeding speed of the variable feeding means.*

*25. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first, variable speed means for feeding the first strand into the loop, a second means for feeding the second strand to the point where they are plied together, said second strand feeding means being driven at a constant speed, the two feeding means controlling the speeds at which their respective strands travel to the plying point, means to vary the strand feeding speed of the said variable feeding means to vary the relative rates of absorption of the first and second strands into the plied strand, and means which is responsive to changes in the size of the loop and which operates the means to vary the strand feeding speed of the variable feeding means.*

*26. In apparatus for twisting together two substantially identical substantially inextensible flexible strands so as to form a symmetrical two-ply strand, said apparatus including a source of supply of a first such strand and a support carrying a let-off strand package for a second such strand, a rotatable shaft operable to rotate a loop of the first strand about the let-off package and also to ply the two strands together, the improvement which comprises strand speed controlling mechanism including*

*a first means for feeding the first strand into the loop, a second means for feeding the second strand to the point where the strands are plied together, the first feeding means being driven at constant speed and feeding its respective strand at a constant speed toward the plying point, the second feeding means feeding its respective strand therepast at a variable speed, said variable speed lying in a narrow range which includes the said constant speed of the first strand fed by the said first constant speed feeding means.*

*27. The apparatus of claim 22 wherein the means for feeding the second strand to the plying junction is a retarded variable speed strand feeding means and is driven by the travel of its respective strand therepast.*

*28. The apparatus of claim 22 wherein the means for feeding the second strand to the plying junction is a variable speed strand feeding means, and the means responsive to changes in the size of the balloon operates the means to vary the strand feeding speed of such variable speed strand feeding means.*

*29. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, a second means for feeding the second strand to the point where they are plied together, a third means for feeding the plied strand away from the plying point, means for changing the tension in the run of the second strand approaching the plying point, and means responsive to changes in the size of the loop for controlling the last named means.*

*30. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, a second means for feeding the second strand at variable speed to the point where they are plied together, a third means for feeding the plied strand away from the plying point at substantially constant speed, and means controlling the second, variable speed feeding means so as to subject the composite run of the second strand and the plied strand extending between the second and third feeding means to variable tension, whereby to vary the relative tensions of the first and second strands as they approach the plying point.*

*31. The mechanism of claim 30 in which the first feeding means is driven at constant speed.*

*32. Mechanism for twisting together two strands so as to form a two-ply strand, comprising a source of supply of a first strand and a support carrying a let-off strand package for a second strand, a rotatable shaft operable to rotate a loop of the first strand about the let-off package and also to ply the two strands together, a first means for feeding the first strand into the loop, a second means for feeding the second strand at a variable speed to the point where they are plied together, a third means for feeding the plied strand away from the plying point at a substantially constant speed, and means responsive to changes in the size of the loop for controlling the speed of the second feeding means.*

*33. Mechanism as defined in claim 32, wherein the first strand feeding means is driven at constant speed.*

*34. Mechanism for twisting together two strands so as to form a two-ply strand, comprising a source of supply of a first strand and a support carrying a let-off strand package for a second strand, a rotatable shaft operable to rotate a balloon of the first strand about the let-off package and also to ply the two strands together, a first, driven means for feeding the first strand into the balloon at a constant speed, and a second means for feeding the second strand at variable speed to the junction where they are plied together.*

*35. Mechanism as defined in claim 34 wherein the second means for feeding the second strand to the plying junction is idle and retarded.*

References Cited in the file of this patent or the original patent

UNITED STATES PATENTS

| | | |
|---|---|---|
| 2,127,921 | Kent | Aug. 23, 1938 |
| 2,503,242 | Clarkson | Apr. 11, 1950 |
| 2,550,136 | Clarkson | Apr. 24, 1951 |
| 2,586,037 | Heffelfinger | Feb. 19, 1952 |
| 2,689,449 | Clarkson | Sept. 21, 1954 |
| 2,729,051 | Clarkson | Jan. 3, 1956 |
| 2,737,773 | Clarkson | Mar. 13, 1956 |